(12) United States Patent
Kalapati et al.

(10) Patent No.: US 9,201,633 B2
(45) Date of Patent: Dec. 1, 2015

(54) CREATION AND DEPLOYMENT OF RESTFUL WEB SERVICES IN A GRAPHICAL PROGRAMMING LANGUAGE

(71) Applicant: NATIONAL INSTRUMENTS CORPORATION, Austin, TX (US)

(72) Inventors: Charles A. Kalapati, Austin, TX (US); Paul A. Spangler, Austin, TX (US); Jared A. Winston, Pflugerville, TX (US)

(73) Assignee: National Instruments Corporation, Austin, TX (US)

( * ) Notice: Subject to any disclaimer, the term of this patent is extended or adjusted under 35 U.S.C. 154(b) by 147 days.

(21) Appl. No.: 13/958,138

(22) Filed: Aug. 2, 2013

(65) Prior Publication Data

US 2015/0040100 A1 Feb. 5, 2015

(51) Int. Cl.
*G06F 9/44* (2006.01)
*G06F 9/445* (2006.01)
*G06F 9/45* (2006.01)

(52) U.S. Cl.
CPC ... *G06F 8/34* (2013.01); *G06F 8/47* (2013.01); *G06F 8/61* (2013.01)

(58) Field of Classification Search
None
See application file for complete search history.

(56) References Cited

U.S. PATENT DOCUMENTS

| | | | |
|---|---|---|---|
| 7,487,513 B1* | 2/2009 | Savchenko et al. | 719/320 |
| 7,882,462 B2* | 2/2011 | Ogilvie et al. | 716/103 |
| 7,917,888 B2* | 3/2011 | Chong et al. | 717/102 |
| 8,140,987 B2* | 3/2012 | Keren et al. | 715/763 |
| 8,312,426 B2 | 11/2012 | Bouillet et al. | |
| 8,516,554 B2 | 8/2013 | Chalana et al. | |
| 2006/0036799 A1* | 2/2006 | Shah et al. | 711/100 |
| 2007/0156868 A1* | 7/2007 | Keren et al. | 709/223 |
| 2007/0157096 A1* | 7/2007 | Keren et al. | 715/760 |
| 2008/0209392 A1* | 8/2008 | Able et al. | 717/105 |

OTHER PUBLICATIONS

Anonymous, "Tutorial: Building and Accessing a LabVIEW Web Service Application (ETS, VxWorks, Windows)," National Instruments Corporation [online], Jun. 2012 [retrieved Feb 17, 2015], Retrieved from Internet: <URL: http://zone.ni.com/reference/en-XX/help/371361J-01/lvhowto/build_web_service/>, pp. 1-6.*

Cazzulino, D., et al., Beginning Visual Web Programming in C#: From Novice to Professional [online], Apress Media, 2004 [retrieved 2014-02-022], Retrieved from Internet <URL: http://link.springer.com/book/10.1007%2F978-1-4302-0728-3>, Chapters 9 and 13, pp. 357-403, 539-585.*

(Continued)

*Primary Examiner* — Todd Aguilera (74) *Attorney, Agent, or Firm* — Meyertons Hood Kivlin Kowert & Goetzel, P.C.; Jeffrey C. Hood; Brian E. Moore (57) ABSTRACT

Method and memory medium for generating a web service. A plurality of graphical data flow programs may be provided, and user input selecting one or more of plurality of graphical data flow programs for inclusion in a web service may be received, The web service may be generated based on the one or more graphical data flow programs. Each graphical data flow program may implement a respective web method, where each web method may implement or request a respective action. The web service may be deployable to a server for hosting, where the web service is invocable over a network to perform the corresponding one or more web methods.

20 Claims, 9 Drawing Sheets

(56) References Cited

OTHER PUBLICATIONS

Anonymous, "Integrating Static Content into a Web Service (ETS, VxWorks, Windows)" National Instruments Corporation [online], 2011 [retrieved Aug. 17, 2015], Retrieved from Internet: <URL: http://zone.ni.com/reference/en-XX/help/371361H-01/lvhowto/ws_static_content/>, pp. 1-2.*

Anonymous, "Free Vibration of a Cantilever Beam (Continuous System)" 2012 [retrieved Aug. 17, 2015], Retrieved from Internet: <URL: http://vlab.amrita.edu/?sub=62&brch=175&sim=1080&cnt=2591>, pp. 1-13.*

Suresh, B., "Web Services Using Apache Axis2: How to build and invoke a web service using Apache Axis2", 2010 [retrieved Aug 17, 2015], Retrieved from Internet: <URL: https://www.ibm.com/developerworks/library/ws-apacheaxis/ws-apacheaxis-pdf.pdf>, pp. 1-39.*

\* cited by examiner

CREATION AND DEPLOYMENT OF RESTFUL WEB SERVICES IN A GRAPHICAL PROGRAMMING LANGUAGE

FIELD OF THE INVENTION

The present invention relates to the field of graphical programming, and more particularly to a method for enabling a graphical program to represent a collection of RESTful Web Methods as independent graphical diagrams, where each diagram contains the logic for a single web method and a collection of graphical diagrams will make up a web service.

DESCRIPTION OF THE RELATED ART

Graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

A typical web service is a collection of independent Hypertext Transfer Protocol (HTTP) web methods that are hosted on a web server. Each HTTP web method is executed when that method receives a remote request over HTTP. Most web services are created using a text based language, such as Java®.

SUMMARY OF THE INVENTION

Various embodiments of a method for enabling a graphical program to represent a collection of web methods as independent graphical diagrams, where the graphical programs are selectable to make up a web service are presented below. Embodiments of the methods disclosed herein may utilize a computer to perform part or all of the method. In some embodiments the methods disclosed herein may be implemented via a non-transitory computer-accessible memory medium that stores program instructions executable by a processor to perform the various disclosed methods.

In one embodiment, a method for generating a web service may include providing a plurality of graphical data flow programs, where each graphical data flow program may include a plurality of interconnected nodes that visually indicate functionality of the graphical data flow program, and where each graphical data flow program implements a respective web method, where each web method may implement or request a respective action. The method may further include receiving user input selecting one or more of the plurality of graphical data flow programs for inclusion in the web service, thereby specifying a corresponding one or more web methods to be included in the web service and generating the web service based on the selected one or more graphical data flow programs, where the web service is deployable to a server for hosting, and where the web service is invocable over a network to perform the corresponding one or more web methods. In certain embodiments the web service may have or include a Representational State Transfer (REST) software architecture.

In certain embodiments, generating the web service may include compiling the selected one or more graphical data flow programs. Additionally, in certain embodiments, the method may further include receiving user input specifying a platform for the compiling, where the compiling may include compiling the selected one or more graphical data flow programs for compatibility with the platform specified. In some embodiments, the platform specified may be a real-time target that may include a real-time operating system. In other embodiments, the compiling may include compiling the selected one or more graphical data flow programs for cross-platform compatibility.

In another embodiment, generating the web service may further include generating an installer for the web service. In other embodiments, the method may further include including the web service and an executable program in an installer, where the installer is executable to install the web service and the executable program, and where the executable program and the web service are configured to operate in conjunction.

In some embodiments, the method may further include receiving user input invoking initial creation of a new web service, where the new web service is not specified. Additionally, the method may include providing and displaying a node for the new web service in a graphical user interface (GUI) in response to the user input invoking creation of the new web service, where the user input selecting the one or more graphical data flow programs for inclusion in the web service specifies the new web service.

In an exemplary embodiment, the method may further include, in response to the user input invoking initial creation of a new web service, providing and displaying at least one sub node for static resources in the GUI, providing and displaying at least one sub node for startup resources in the GUI, where the startup resources perform initialization and communication with the web methods, and providing and displaying at least one sub node for web resources in the GUI, where the web resources include the one or more graphical data flow programs selected for inclusion in the web service.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Web Services—refers to a software system for interoperable machine-to-machine interaction over a network, including an interface described in a machine-processable format. Other systems, e.g., computer systems, interact with the web service in a manner prescribed by the web service's description, e.g., using Simple Object Access Protocol (SOAP) messages, typically conveyed using HTTP with an XML serialization in conjunction with other web-related standards.

REST or RESTful—refers to Representational State Transfer (REST), a style of software architecture for distributed systems such as the World Wide Web, as presented by Roy Thomas Fielding in his dissertation entitled "Architectural Styles and the Design of Network-based Software Architectures" © 2000 by Roy Thomas Fielding.

REST-Compliant Web Service—refers to a web service whose primary service purpose is to manipulate Extensible Markup Language (XML) representation of web resources using a uniform set of stateless operations.

Stateless—refers to a communications protocol that treats each request as an independent transaction unrelated to any previous request, enabling communication to consist of independent pairs of requests and responses. Examples of stateless protocols include the Internet Protocol (IP) which is the foundation for the Internet, and the Hypertext Transfer Protocol (HTTP) which is the foundation of data communication for the World Wide Web.

Web Method—refers to a desired request or implementation of an action to be performed on an identified resource. Examples include HTTP methods such as GET, POST, HEAD, OPTIONS, PUT, DELETE, TRACE, CONNECT, and so forth.

Web Method VI—refers to a graphical data flow program that may implement a respective web method that receives and sends data using connector pane terminals.

SOAP—refers to the Simple Object Access Protocol (SOAP), a protocol specification for exchanging structured information in the implementation of web services in computer networks.

HTTP—refers to the Hypertext Transfer Protocol (HTTP), an application protocol for distributed, collaborative, hypermedia information systems. Hypertext is structured text that uses logical links (hyperlinks) between nodes containing text. HTTP is the protocol to exchange or transfer hypertext.

XML—refers to the Extensible Markup Language (XML), a markup language that defines a set of rules for encoding documents in a format that is both human-readable and machine-readable.

HTML—refers to the HyperText Markup Language (HTML), a markup language for creating web pages and other information that can be displayed in a web browser.

JSON—refers to JAVASCRIPT Object Notation (JSON), a lightweight data-interchange format characterized by its ease for humans to read and write and corresponding ease for machines to parse and generate.

Serialization—refers to the process of translating data structures or object state into a format that can be stored (for example, in a file or memory buffer, or transmitted across a network connection link) and resurrected later in the same or another computer environment.

Figure 1A:
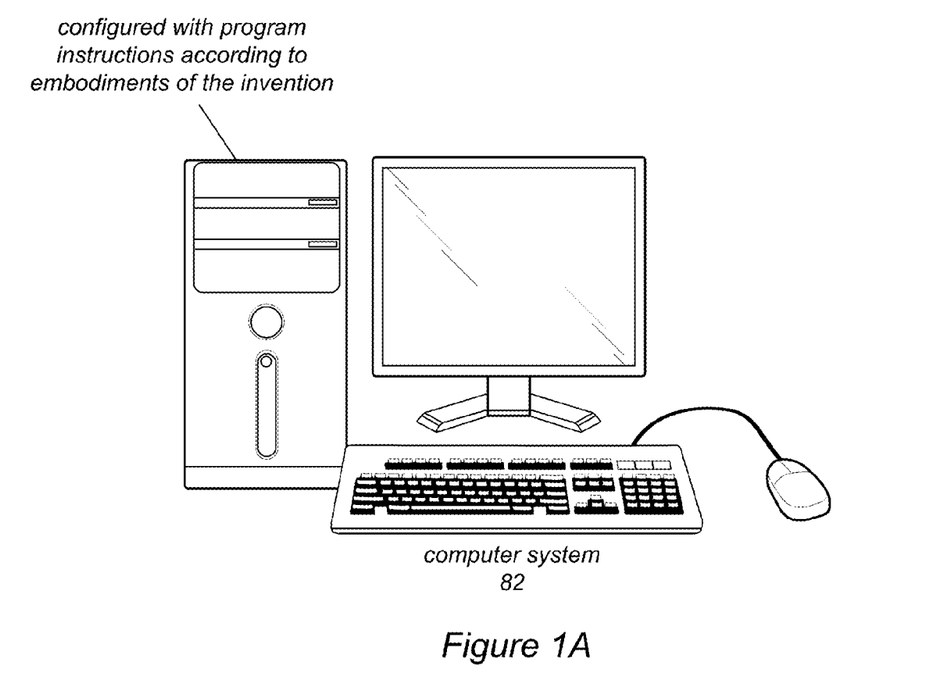
FIG. 1A illustrates a computer system configured to execute a graphical program according to an embodiment of the present invention.

FIG. 1A—Computer System

FIG. 1A illustrates a computer system 82 configured to execute a graphical program configured to generate a deployable web service from one or more graphical data flow programs. One embodiment of a method for creating a graphical program configured to generate a deployable web service from one or more graphical data flow programs is described below.

As shown in FIG. 1A, the computer system 82 may include a display device configured to display the graphical program as the graphical program is created and/or executed. The display device may also be configured to display a graphical user interface or front panel of the graphical program during execution of the graphical program. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more graphical programs which are executable to perform the methods described herein. Additionally, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

Figure 1B:
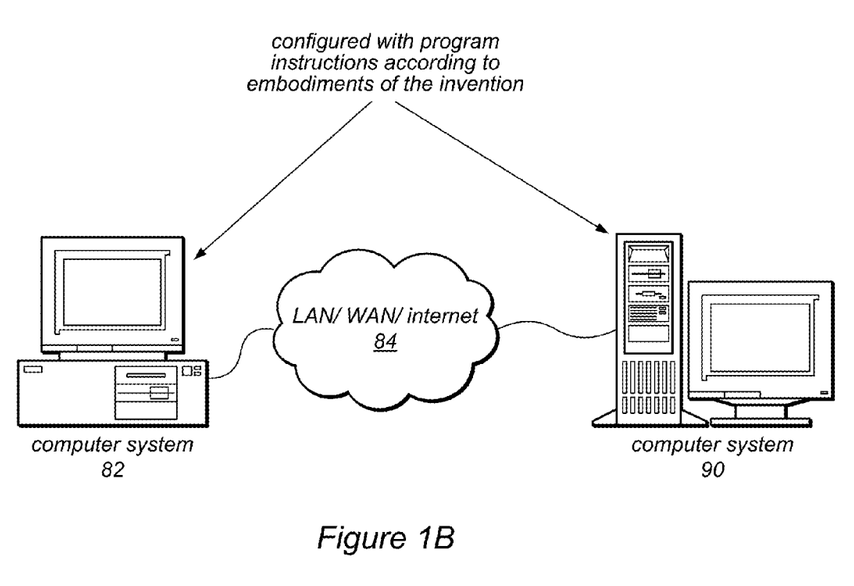
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
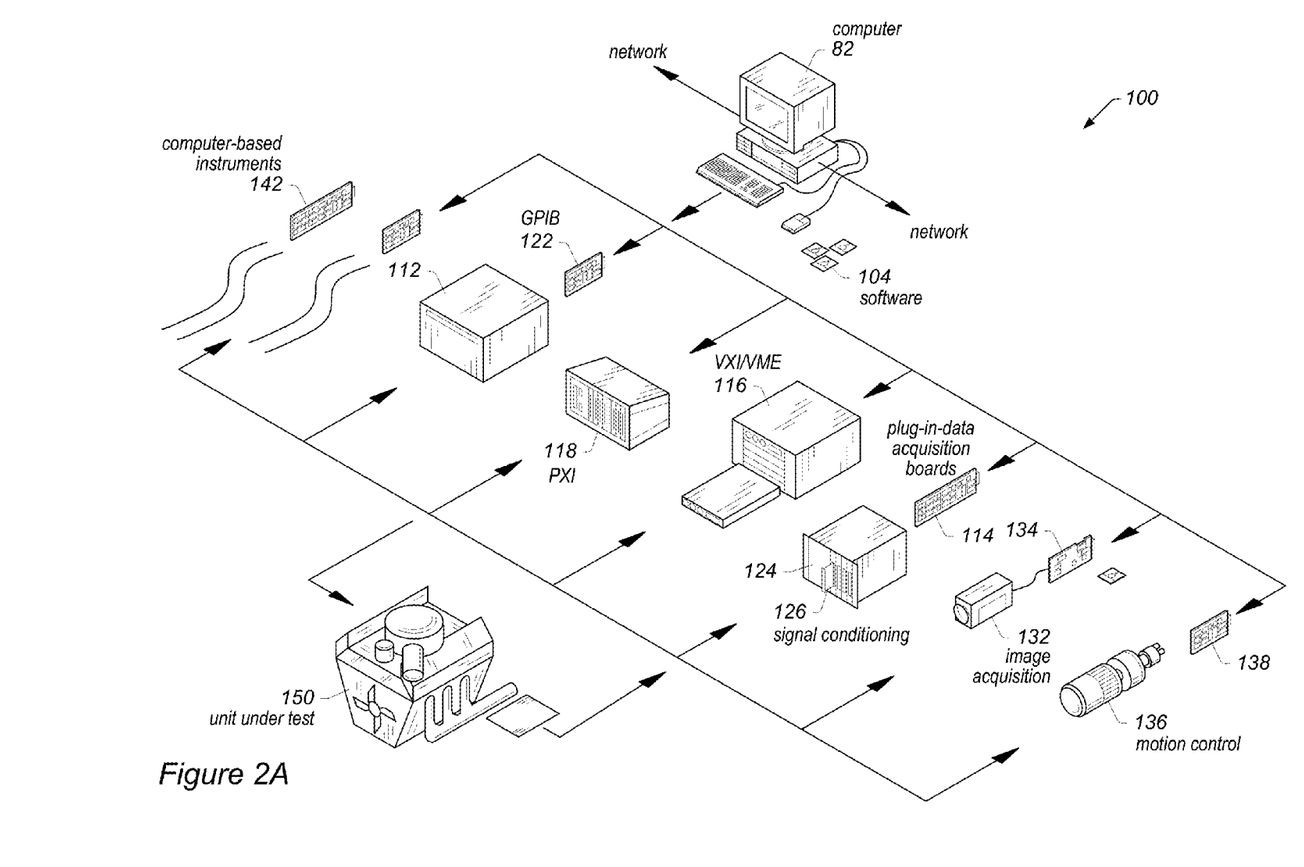
FIG. 2A illustrates an instrumentation control system according to one embodiment of the invention.

FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150, e.g., via execution of software 104.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
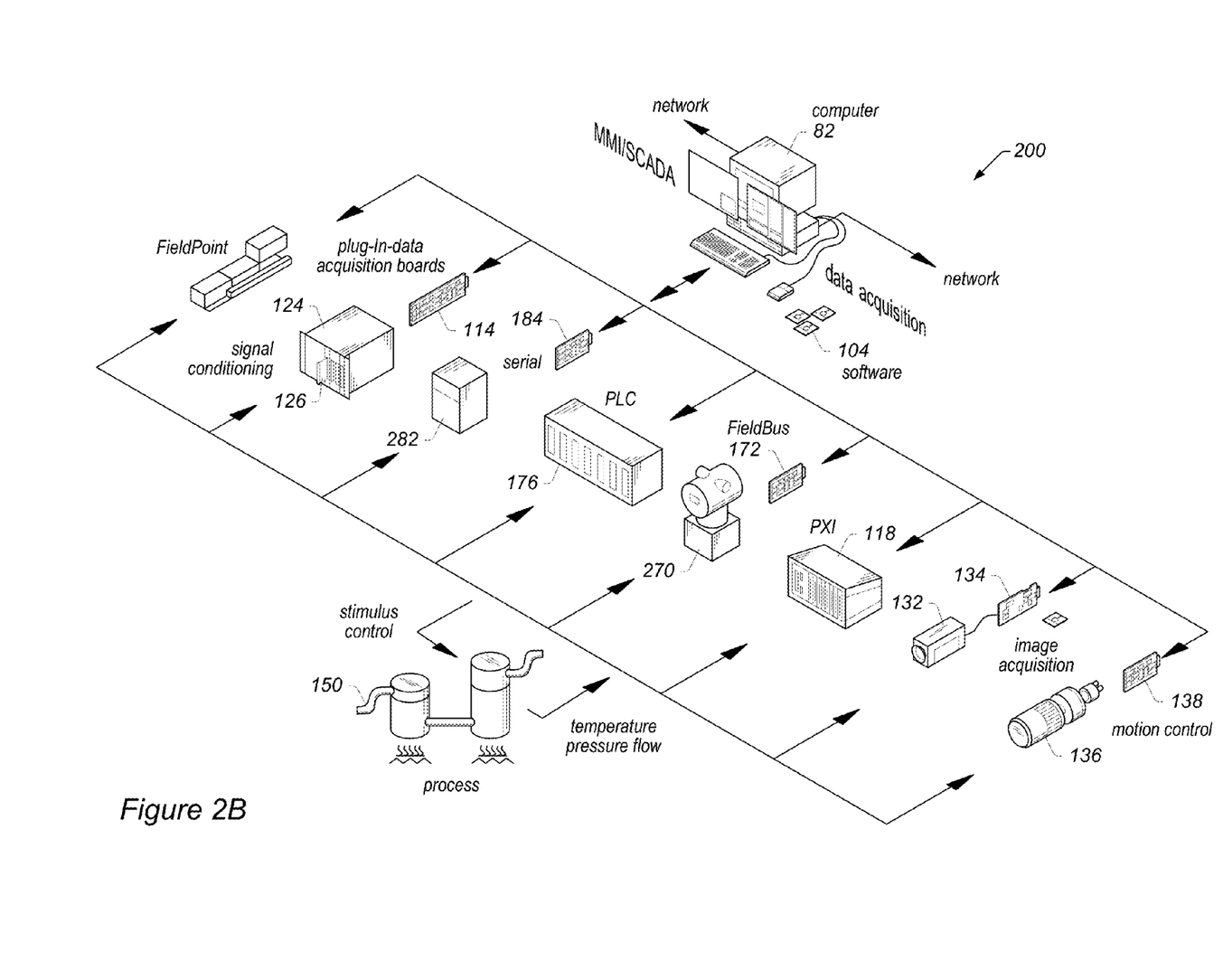
FIG. 2B illustrates an industrial automation system according to one embodiment of the invention.

FIG. 2B illustrates an exemplary industrial automation system 200 which may implement embodiments of the invention. The industrial automation system 200 is similar to the instrumentation or test and measurement system 100 shown in FIG. 2A. Elements which are similar or identical to elements in FIG. 2A have the same reference numerals for convenience. The system 200 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others, e.g., via execution of software 104.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 270 and associated fieldbus interface card 172, a PLC (Programmable Logic Controller) 176, a serial instrument 282 and associated serial interface card 184, or a distributed data acquisition system, such as the Fieldpoint system available from National Instruments, among other types of devices.

Figure 3A:
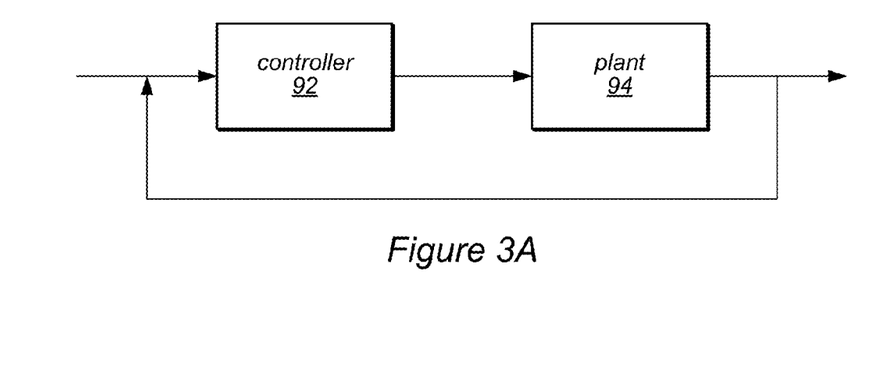
FIG. 3A is a high level block diagram of an exemplary system which may execute or utilize graphical programs.

FIG. 3A is a high level block diagram of an exemplary system which may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 3B:
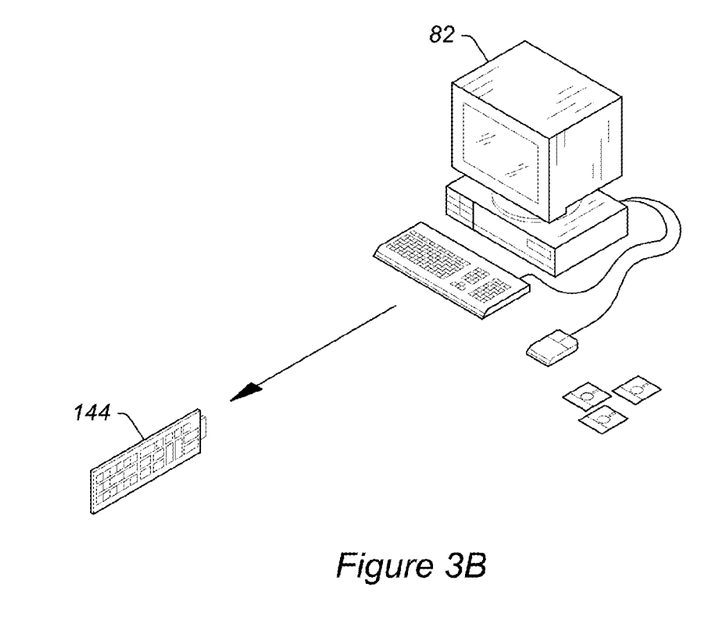
FIG. 3B illustrates an exemplary system which may perform control and/or simulation functions utilizing graphical programs.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
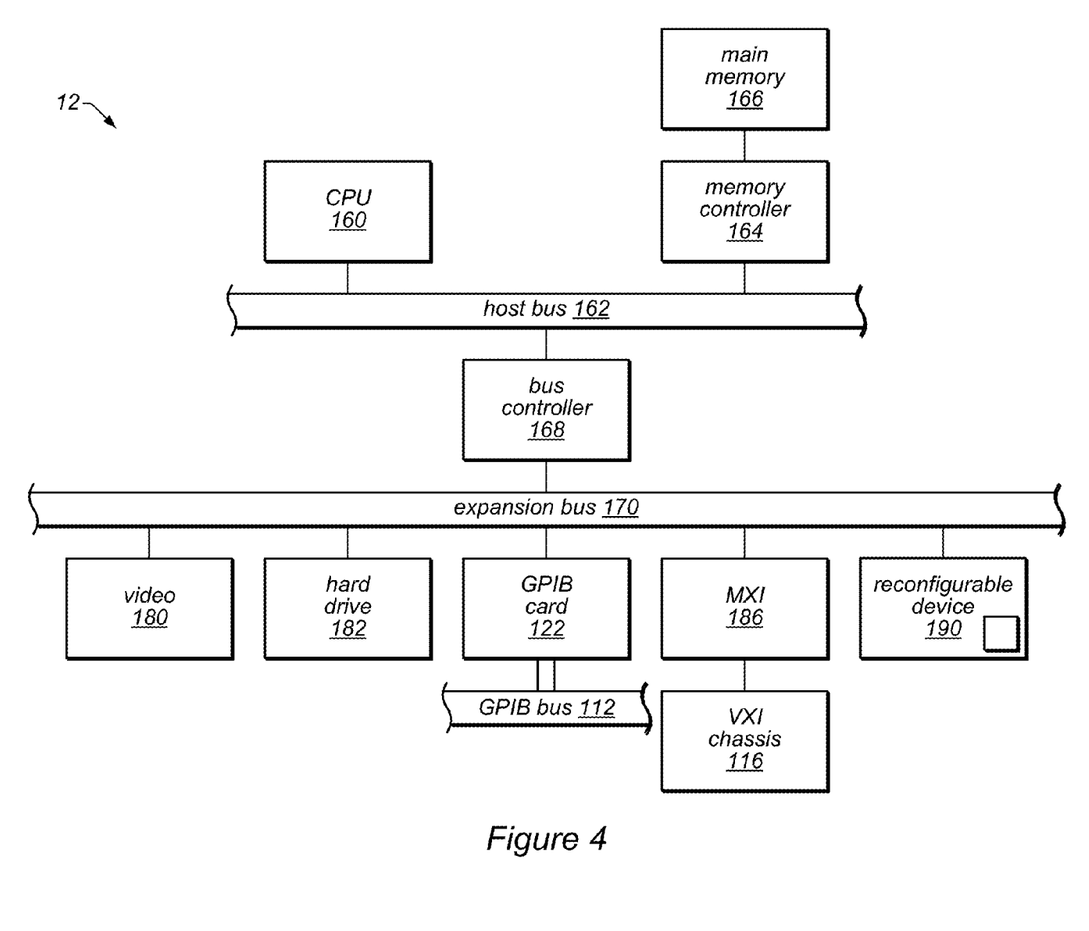
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a PENTIUM class processor, a PCPOWERPC processor, a CPU from the SPARC family of RISC processors, as well as others. A memory medium, typically comprising RAM and referred to as main memory, 166 is coupled to the host bus 162 by means of memory controller 164. The main memory 166 may store at least one program, e.g., a graphical program, e.g., implementing a software tool, configured to generate a deployable web service from one or more graphical data flow programs. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, a device 190 may also be connected to the computer. The device 190 may include a processor and memory which may execute a real time operating system. The device 190 may also or instead comprise a programmable hardware element. The computer system may be configured to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g.,Ccode) generated from the graphical program. As another example, the deployed graphical program may take the form of compiled code generated from either the graphical program or from text code that in turn was generated from the graphical program.

Figure 5:
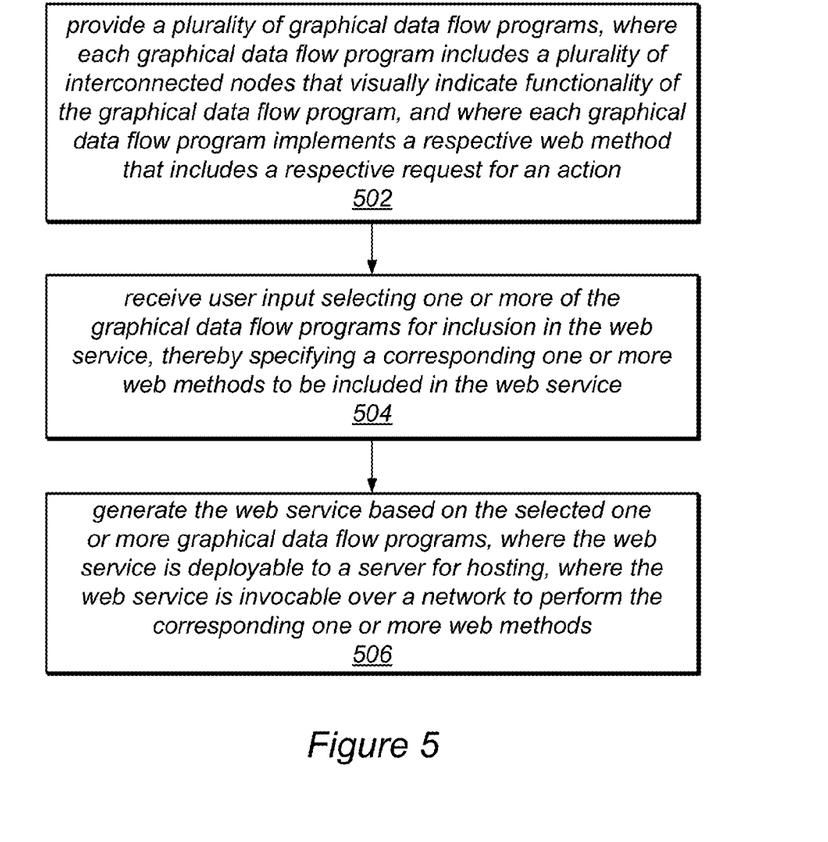
FIG. 5 is a flowchart diagram illustrating one embodiment of a method for creating (or executing) a graphical program configured to generate a web service.

FIG. 5—Flowchart of a Method for Generating a Web Service

FIG. 5 illustrates a method for generating a deployable web service from one or more graphical data flow programs. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

Figure 6:
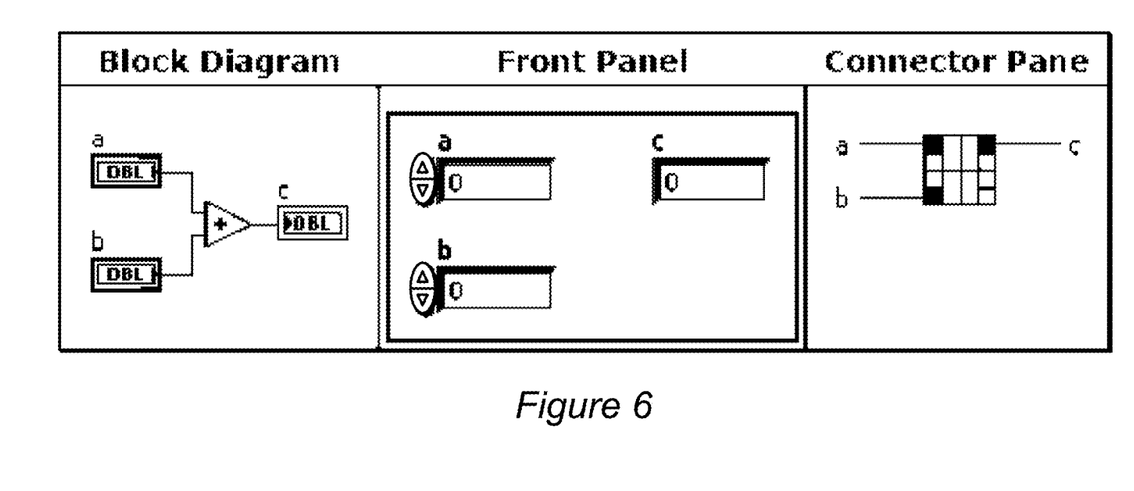
FIG. 6 is a diagram illustrating one embodiment of a graphical program.

First, in 502 a plurality of graphical data flow programs may be provided. Each graphical data flow program may include a plurality of interconnected nodes that visually indicate the functionality of the graphical data flow program. Additionally, each graphical data flow program may implement a respective web method, such as a HTTP web method, where each web method implements or requests a respective action. Examples of HTTP web methods include, but are not limited to, GET, POST, HEAD, OPTIONS, PUT, DELETE, TRACE, and CONNECT. In one embodiment, at least one web method may implement, include, or invoke, a virtual instrument (VI), and thus may be referred to herein as a web method VI. For example, the one or more graphical data flow programs may implement a respective web method that receives and sends data using connector pane terminals, such as terminals "a", "b", and "c" illustrated in the Block Diagram, Front Panel, and Connector Pane of FIG. 6. For example, when a web client sends an HTTP request to a web method VI, the VI may receive values for specific controls, as illustrated on the Front Panel and Block Diagram of FIG. 6, on their connector pane, process those values, and return a result to the client via an indicator, such as indicator "c" on the connector pane of FIG. 6.

It should be noted, that web method VIs are not limited in functionality to the common list of HTTP web methods, but may include any functionality of a graphical data flow program, subject only to the data types supported, i.e., data types such as string, path, Boolean, numeric, enumeration, array, cluster, digital/analog waveform, timestamp (formatted as string), and so forth. Some data types may only be available for certain markup languages, such as Extensible Markup Language (XML) or JAVACRIPT Object Notation (JSON). XML refers to a markup language that defines a set of rules for encoding documents in a format that is both human-readable and machine-readable. JSON refers to a lightweight data-interchange format characterized by its ease for humans to read and write and corresponding ease for machines to parse and generate In 504, user input may be received selecting one or more of the plurality of graphical data flow programs for inclusion in the web service. Selecting one or more of the plurality of graphical data flow programs may specify a corresponding one or more web methods to be included in the web service.

It should be noted that a web service refers to a software system for interoperable machine-to-machine interaction over a network, including an interface described in a machine-processable format. Other systems, e.g., computer systems, may interact with the web service in a manner that may be prescribed by the web service's description, such as using Simple Object Access Protocol (SOAP) messages. SOAP refers to a protocol specification for exchanging structured information in the implementation of web services in computer networks. SOAP messages are typically conveyed using HTTP with an XML serialization in conjunction with other web-related standards.

In some embodiments, the web service may have or include a Representation State Transfer (REST) software architecture, and thus may be referred to as a RESTful web service. REST, or RESTful refers to a style of software architecture for distributed systems such as the World Wide Web, as presented by Roy Thomas Fielding in his dissertation entitled "Architectural Styles and the Design of Network-based Software Architectures" © 2000 by Roy Thomas Fielding. The use of a RESTful web service architecture is advantageous because the architecture provides a lightweight protocol accessible to a wide variety of HTTP-enabled clients and does not require complex message parsing.

In 506, a web service may be generated based on the selected one or more graphical data flow programs. The web service may be deployable to a server for hosting. In such instances, the web service may be invocable over a network to perform the corresponding one or more web methods. In some embodiments, the generating of the web service may include compiling the selected one or more graphical data flow programs. In other embodiments, user input may be received specifying a platform for compiling. In such embodiments, compiling the selected one or more graphical data flow programs may include compiling the selected one or more graphical data flow programs for compatibility with the platform specified. In some embodiments, the platform specified may be a real-time target that includes a real-time operating system. In other words, the web service may be generated to be compatible with a real-time operating system. In other embodiments, the platform specified may be a Windows™ operating system, or other server operating system. In certain embodiments, compiling the selected one or more graphical data flow programs may include compiling the one or more graphical data flow programs for cross-platform compatibility. For example, the compiling may allow the compiled one or more graphical data flow programs to run on both a real-time operating system and a Windows™ operating system.

In some embodiments, generating the web service may further include generating an installer for the web service. In other embodiments, the method may further include including the web service and an executable program in an installer. In such embodiments, the installer is executable to install the web service and the executable program, where the executable program and the web service are configured to operate in conjunction. In other words, the web service and the executable program are configured to work together.

Figure 7:
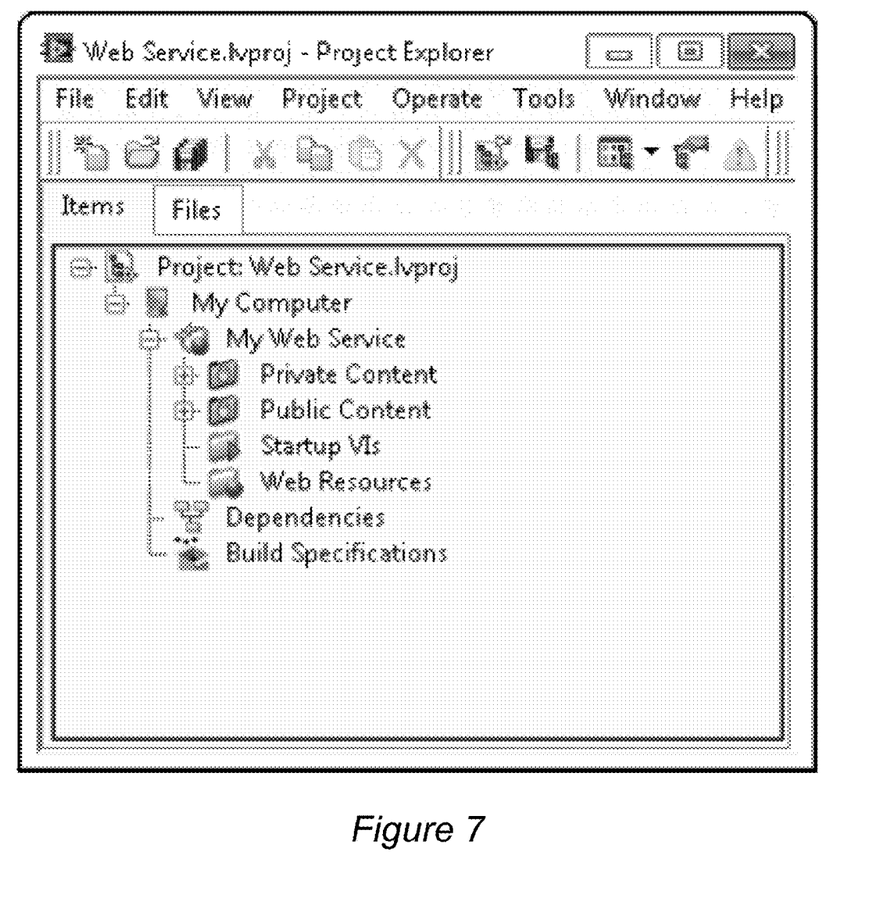
FIG. 7 is a diagram illustrating one embodiment of a graphical user interface configured to supply a user with nodes to specify a web service.

In some embodiments, as illustrated of FIG. 7, the method may further include receiving user input invoking initial creation of a new web service. In such instances, the new web service may not be specified. Additionally, the method may include providing and displaying a node for the new web service in a graphical user interface (GUI) such as the "My Web Service" node of FIG. 7. Thus, the user input selecting the one or more graphical data flow programs for inclusion in the web service specifies the new web service.

Referring now specifically to FIG. 7, a GUI, such as the one illustrated in FIG. 7, may include a node for a project, such as "Project: Web Service.lvprog." This node may represent a collection of graphical data flow programs and other resources. Another node, such as sub node "My Computer" may be used to reference a location of resources, such as the previously mentioned "My Web Service" node. It should be noted that the location may be local, e.g., on the computer, or it may be remote, e.g., accessible over a network, an intranet, or the Internet. As shown in FIG. 7, in some embodiments, the method may further include, in response to the user input invoking initial creation of new web service, providing and displaying at least one sub node for static resources in the GUI, such as the "Public Content" and "Private Content" sub nodes of FIG. 7. Static content may include web content such as HyperText Markup Language (HTML) files, stylesheets, movies, JavaScripts, and so forth. Additionally, if the content is placed under the "Private Content" sub node, clients, e.g., users of the web service, cannot access the files via HTTP requests. Alternatively, if the content is placed under the "Public Content" sub node, clients may access the files via HTTP requests.

Additionally, the method may further include, in response to the user input invoking initial creation of the new web service, providing and displaying at least one sub node for startup resources in the GUI, such as the "Startup VIs" sub node of FIG. 7, where the startup resources may perform initialization and communication with the web methods. In some embodiments, startup resources may perform tasks in a web service such as loading data from a file to initialize a value, processing and manipulating data the web service receives from clients, periodically saving data to a file while the web service runs, and so forth.

Also, in some embodiments, the method may further include, in response to the user input invoking initial creation of the new web service, providing and displaying at least one sub node for web resources in the GUI, such as the "Web Resources" sub node of FIG. 7, where the web resources include one or more of the one or more graphical data flow programs selected for inclusion in the web service. In some embodiment, additional sub nodes may be provided and displayed under the web resources sub node. Such sub nodes are useful for grouping graphical data flow programs that perform actions on elements, such as a collection of clients.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for generating a web service, the method comprising:
   utilizing a computer to perform:
      displaying a node representing a new web service in a graphical user interface (GUI) in response to user input invoking initial creation of the new web service;
      displaying a plurality of sub nodes in the GUI hierarchically below the node representing the web service, wherein the plurality of sub nodes includes:
         at least one sub node that represents startup resources, configured to perform initialization and communication with one or more web methods for the web service; and at least one sub node that represents web resources, configured for inclusion in the web service, wherein the web resources implement the one or more web methods for the web service;

including one or more graphical data flow programs in the at least one sub node, in response to user input selecting the one or more graphical data flow programs for inclusion in the web service, wherein each graphical data flow program comprises a plurality of interconnected nodes that visually indicate functionality of the graphical data flow program, wherein each graphical data flow program implements a respective startup resource or a respective web method that implements or requests a respective action, and wherein at least one of the selected one or more graphical data flow programs implements a startup resource; and generating the web service based at least in part on the selected one or more graphical data flow programs, wherein the web service is deployable to a server for hosting, wherein the web service is invocable over a network to perform the one or more web methods.

2. The method of claim 1, wherein the web service comprises a Representational State Transfer (REST) software architecture.

3. The method of claim 1, wherein said generating the web service comprises compiling the selected one or more graphical data flow programs.

4. The method of claim 3, further comprising:
utilizing the computer to perform:
receiving user input specifying a platform for said compiling, wherein said compiling comprises compiling the selected one or more graphical data flow programs for compatibility with the platform specified.

5. The method of claim 4, wherein the platform specified is a real-time target comprising a real-time operating system.

6. The method of claim 3, wherein said compiling comprises compiling the selected one or more graphical data flow programs for cross-platform compatibility.

7. The method of claim 1, further comprising:
utilizing the computer to perform:
in response to the user input invoking initial creation of a new web service:
providing and displaying at least one sub node representing static resources in the GUI hierarchically below the node representing the web service, wherein the static resources comprise one or more of:
public content, comprising at least one file to be made accessible to clients by the web service; or
private content, comprising at least one file that is not made accessible to clients by the web service.

8. The method of claim 1, wherein said generating the web service further comprises generating an installer for the web service.

9. The method of claim 1, further comprising:
utilizing the computer to perform:
including the web service and an executable program in an installer, wherein the installer is executable to install the web service and the executable program, and wherein the executable program and the web service are configured to operate in conjunction.

10. A non-transitory computer-accessible memory medium that stores program instructions executable by a processor to perform:

displaying a node representing a new web service in a graphical user interface (GUI) in response to user input invoking initial creation of the new web service;

displaying a plurality of sub nodes in the GUI hierarchically below the node representing the web service, wherein the plurality of sub nodes includes:

at least one sub node that represents startup resources, configured to perform initialization and communication with one or more web methods for the web service; and at least one sub node that represents web resources, configured for inclusion in the web service, wherein the web resources implement the one or more web methods for the web service;

including one or more graphical data flow programs in the at least one sub node, in response to user input selecting the one or more graphical data flow programs for inclusion in the web service, wherein each graphical data flow program comprises a plurality of interconnected nodes that visually indicate functionality of the graphical data flow program, wherein each graphical data flow program implements a respective startup resource or a respective web method that implements or requests a respective action, and wherein at least one of the selected one or more graphical data flow programs implements a startup resource; and generating the web service based at least in part on the selected one or more graphical data flow programs, wherein the web service is deployable to a server for hosting, wherein the web service is invocable over a network to perform the one or more web methods.

11. The non-transitory computer-accessible memory medium of claim 10, wherein the web service comprises a Representational State Transfer (REST) software architecture.

12. The non-transitory computer-accessible memory medium of claim 10, wherein said generating the web service comprises compiling the selected one or more graphical data flow programs.

13. The non-transitory computer-accessible memory medium of claim 12, wherein the program instructions are further executable to perform:
receiving user input specifying a platform for said compiling, wherein said compiling comprises compiling the selected one or more graphical data flow programs for compatibility with the platform specified.

14. The non-transitory computer-accessible memory medium of claim 13, wherein the platform specified is a real-time target comprising a real-time operating system.

15. The non-transitory computer-accessible memory medium of claim 12, wherein said compiling comprises compiling the selected one or more graphical data flow programs for cross-platform compatibility.

16. The non-transitory computer-accessible memory medium of claim 10, wherein the program instructions are further executable to perform:
in response to the user input invoking initial creation of a new web service:
displaying at least one sub node representing static resources in the GUI hierarchically below the node representing the web service, wherein the static resources comprise one or more of:
public content, comprising at least one file to be made accessible to clients by the web service; or
private content, comprising at least one file that is not made accessible to clients by the web service.

17. The non-transitory computer-accessible memory medium of claim 10, wherein said generating the web service further comprises generating an installer for the web service.

18. The non-transitory computer-accessible memory medium of claim 10, wherein the program instructions are further executable to perform:
including the web service and an executable program in an installer, wherein the installer is executable to install the web service and the executable program, and wherein the executable program and the web service are configured to operate in conjunction.

19. A system, comprising:
a processor; and
a memory, coupled to the processor, wherein the memory stores program instructions executable by the processor to:
display a node representing a new web service in a graphical user interface (GUI) in response to user input invoking initial creation of the new web service;
display a plurality of sub nodes in the GUI hierarchically below the node representing the web service, wherein the plurality of sub nodes includes:
at least one sub node that represents startup resources, configured to perform initialization and communication with one or more web methods for the web service; and
at least one sub node that represents web resources, configured for inclusion in the web service, wherein the web resources implement the one or more web methods for the web service;
include one or more graphical data flow programs in the at least one sub node, in response to user input selecting the one or more graphical data flow programs for inclusion in the web service, wherein each graphical data flow program comprises a plurality of interconnected nodes that visually indicate functionality of the graphical data flow program, wherein each graphical data flow program implements a respective startup resource or a respective web method that implements or requests a respective action, and wherein at least one of the selected one or more graphical data flow programs implements a startup resource; and
generate the web service based at least in part on the selected one or more graphical data flow programs, wherein the web service is deployable to a server for hosting, wherein the web service is invocable over a network to perform the one or more web methods.

20. The system of claim 19, wherein the web service comprises a Representational State Transfer (REST) software architecture.

\* \* \* \* \*